3,382,195
PROCESS OF MAKING POLYAMIDE FOAMS
Heinrich Gilch, Krefeld, and Hermann Schnell, Krefeld-Urdingen, Germany, assignors to Farbenfabriken Bayer Aktiengesellschaft, Leverkusen, Germany, a corporation of Germany
No Drawing. Filed Feb. 24, 1966, Ser. No. 529,651
Claims priority, application Germany, Mar. 26, 1965, F 45,649
7 Claims. (Cl. 260—2.5)

ABSTRACT OF THE DISCLOSURE

A process of preparing polyamide foams by heating at a temperature of 150 to 270° C. a lactam in the presence of 0.05–10% of an isocyanate or a carbamidolactam and 0.05 to 10% of an alkali metal formate or alkaline earth metal formate based on the amount of starting lactam.

---

This invention relates to polyamide foams and to an economic process for the production of polyamide foams by foaming during the polymerisation of lactams.

It is known that polyamide foams can be produced by polymerising lactams in the presence of bases such as sodium caprolactam and a co-catalyst such as isocyanate or acylated lactams and blowing nitrogen through the reaction mixture during polymerisation. It has also been proposed to carry out the polymerisation in the presence of substances, such as azides, which form or liberate gas. These processes are based on the known basic polymerisation of lactams and differ from it only in the production of the gas required for formation of the foam. Polymerisations of this kind have to be carried out under the very strictest exclusion of water and the lactams have to be dried particularly carefully before polymerisation. Since the bases used generally hydrolyse easily, they must also be protected from moisture. Like the gas-forming azides, they are also rather dangerous to handle. The injection of nitrogen requires complicated apparatus and therefore excludes certain fields of application.

It has now been found that polyamide foams can be produced in a simple manner by heating a lactam in the presence of 0.05–10% of an isocyanate or a carbamidolactam and 0.05 to 10% of an alkali—or alkaline earth formate, based on the amount of lactam used, at temperatures of 150 to 270° C.

Surprisingly, this process does not require preliminary drying of the lactams and is therefore particularly easy to carry out. All the reactants are harmless and easy to handle. According to the process, lactams having at least 7 ring members, such as capro-, capryl- and lauroyl-lactam, may be used, either alone or in mixtures.

As catalysts there are used alkali metal or alkaline earth formates such as sodium formate or calcium formate. Preferably, finely powdered products which do not contain any water of crystallisation are used, but the usual commercial products can be used without any further mechanical disintegration, purification or drying.

As co-catalysts there may be used alkyl or aryl mono- or polyisocyanates such as stearyl isocyanate, phenyl isocyanate, hexamethylene diisocyanate and phenylene diisocyanate. The reaction products of isocyanates and lactams such as hexamethylene-1,6-bis-carbamidocaprolactam, which are particularly easy to handle, act in the same way.

The reaction is carried out at temperatures of 150 to 270° C. The preferred temperature range is from 170 to 250° C.

As will be shown in the examples, the induction time, i.e. the time which elapses before foam formation sets in, depends on the reaction temperature. In the temperature region at 170 to 250° C., the induction times lie between 720 and 8 seconds.

The density of the foams is between 0.2 and 0.5 g./cm.$^3$, but it can be further reduced by the addition of substances which evaporate at the reaction temperature, e.g. xylene or dioxane. Homopolymers as a rule yield hard products. Elastic foams can be produced by copolymerisation of lactams such as caprolactam and lauroyl lactam. The relative viscosity of the polymers in 1% m-cresol varies between 9.42 and 11.35. A large proportion of the polymers is cross-linked.

Fillers such as asbestos powder, talcum, glass- and asbestos fibres as well as dyestuffs and pigments may be added to the foam produced in accordance with the process. Polyamide foams produced by this process may be used wherever electrical, thermal or acoustic insulation is required and at the same time mechanical stresses arise. For example, they may be used in the building industry for filling cavities, in which case the foam has to be filled in before solidification. In that case, it is preferable to produce the foam in an extruder. By carrying out the foaming process in moulds, it is possible to produce foam bodies of a certain form which can also withstand high mechanical loads. Shaped bodies of this type may, for example, be used in the building industry or for the manufacture of heat insulated containers; they can also be worked with saws and with chip-cutting tools. Screws and nails can be fixed into these foams. Elastic products are particularly suitable for the electric insulation of wires. The following examples illustrate the invention:

EXAMPLE 1

A mixture of 10 g. caprolactam, 0.2 g. sodium formate and 0.4 g. hexamethylene diisocyanate is heated to 230° C. and at the same time stirred in a glass vessel. After an induction time of 30 seconds, polymerisation accompanied by foam formation sets in. The density of the foam is 0.294 g./cm.$^3$.

As shown in Table 1, the induction time is a function of the reaction temperature.

TABLE 1

| Experiment | Temperature, °C. | Induction time in seconds | Density, g..cm.$^3$ |
|---|---|---|---|
| 1 | 170 | 720 | 0.347 |
| 2 | 180 | 496 | 0.345 |
| 3 | 190 | 295 | 0.384 |
| 4 | 200 | 103 | 0.312 |
| 5 | 220 | 68 | |
| 6 | 230 | 30 | 0.294 |
| 7 | 240 | 10 | 0.348 |
| 8 | 250 | 8 | |
| 9 | 260 | 7 | |
| 10 | 270 | 5 | |

EXAMPLE 2

A mixture of 10 g. caprolactam, 0.2 g. sodium formate and 0.05 g. hexamethylenediisocyanate is heated to 180° C. in a glass vessel and stirred at the same time. Foam formation sets in after 4 minutes. Density of foam: 0.402 g./cm.$^3$.

Table II shows the induction time and the density of foam related to the isocyanate concentration.

TABLE II

| Experiment | Hexamethylene diisocyanate, g. | Induction time, minutes | Density, g./cm.$^3$ |
|---|---|---|---|
| 23 | 0.2 | 4 | 0.402 |
| 24 | 0.1 | 14 | 0.500 |
| 25 | 0.05 | 23 | 0.625 |

EXAMPLE 3

A mixture of 10 g. caprolactam, 0.2 g. hexamethylene diisocyanate and 1 g. sodium formate is heated to 220° C. in a glass vessel and stirred at the same time. Polymerisation and foam formation set in after 45 seconds. Density of the foam 0.367 g./cm.$^3$.

Table III shows the dependence of the induction time on the sodium formate concentration.

TABLE III

| Experiment | Sodium formate, g. | Induction time, seconds | Density, g./cm.$^3$ |
|---|---|---|---|
| 26 | 1 | 45 | 0.367 |
| 27 | 2 | 240 | 0.333 |
| 28 | 3 | 360 | 0.350 |

EXAMPLE 4

A mixture of 5 g. caprolactam, 0.1 g. sodium formate, 0.2 g. hexamethylene diisocyanate and 0.5 g. dioxane is heated, with stirring, to 180° C. in a glass vessel. Polymerisation and foam formation set in after 5 minutes.

Table IV shows the results obtained with blowing agents such as toluene, benzene and xylene.

TABLE IV

| Experiment | Blowing agent, ml. | Induction time, minutes | Density, g./cm.$^3$ |
|---|---|---|---|
| 39 | 0.1 toluene | 10 | 0.297 |
| 42 | 0.5 toluene | 6 | 0.220 |
| 43 | 1.0 toluene | 6 | 0.205 |
| 44 | 2.0 toluene | 5 | ($^1$) |
| 41 | 0.1 benzene | 6 | 0.295 |
| 45 | 0.5 dioxane | 5 | 0.197 |

$^1$ Foam collapses.

EXAMPLE 5

A mixture of 2.5 g. caprolactam, 0.05 g. sodium formate, 0.1 g. hexamethylene diisocyanate, 2 g. asbestos powder and 0.5 ml. toluene is heated to 190° C., with stirring, in a glass vessel. Foam formation sets in after 4 minutes. Density of the foam 0.288 g./cm.$^3$. Talcum and sea sand may also be used as fillers.

EXAMPLE 6

A mixture of 5 g. lauroyl lactam, 0.1 sodium formate, 0.2 g. hexamethylene diisocyanate and 0.5 ml. xylene are heated to 200° C., with stirring in a glass vessel. Polymerisation and foam formation set in after 2 minutes. Density of the foam 0.295 g./cm.$^3$.

EXAMPLE 7

A mixture of 2.5 g. caprolactam, 2.5 g. lauroyl lactam, 0.1 g. sodium formate, 0.2 g. hexamethylene diisocyanate and 0.5 ml. xylene is heated to 200° C. with stirring. Polymerisation and foam formation set in after 4 minutes. Density of the foam 0.203 g./cm.$^3$.

EXAMPLE 8

A mixture of 5 g. caprolactam, 0.1 g. sodium formate and 0.2 ml. phenylene diisocyanate is heated to 200° C., with stirring, in a glass vessel. Polymerisation and foaming set in after 150 seconds. Density of the foam 0.32 g./cm.$^3$.

EXAMPLE 9

A mixture of 5 g. caprolactam, 0.1 g. sodium formate and 0.4 ml. stearyl isocyanate is heated to 200° C. with stirring. Polymerization and foam formation set in after 5 minutes.

EXAMPLE 10

A mixture of 5 g. caprolactam, 0.1 g. calcium formate and 0.2 ml. hexamethylene diisocyanate is heated to 200° C. with stirring. Polymerisation accompanied by foam formation sets in after 7 minutes. Density of the foam 0.40 g./cm.$^3$.

EXAMPLE 11

A mixture of 5 g. caprolactam, 0.1 g. sodium formate and 0.6 g. hexamethylene-1,6-biscarbamidocaprolactam is heated to 200° C. Foam formation sets in after 6 minutes. Density of foam 0.32 g./cm.$^3$.

What we claim is:

1. Process for the production of polyamide foams, which comprises heating a lactam having at least 7 ring members in the presence of an alkali metal formate or alkaline earth formate and an organic isocyanate or its addition product to a lactam at temperatures of 150 to 270° C.

2. The process of claim 1, wherein 0.05 to 10% by weight based on the amount of the lactam of said alkali metal formate or alkaline earth formate being used.

3. The process of claim 1, wherein 0.05 to 10% by weight based on the amount of the lactam of said organic isocyanate or its addition product to the lactam being used.

4. The process of claim 1, wherein said lactam is ε-caprolactam.

5. The process of claim 1, wherein said alkali metal formate is sodium formate.

6. The process of claim 1, wherein said organic isocyanate is hexamethylene-1,6-diisocyanate.

7. The process of claim 1, wherein said organic isocyanate is stearylisocyanate.

References Cited

UNITED STATES PATENTS

| | | | |
|---|---|---|---|
| 3,017,391 | 1/1962 | Mottus et al. | 260—78 |
| 3,028,369 | 4/1962 | Butler et al. | 260—78 |
| 3,061,592 | 10/1962 | Schnell et al. | 260—78 |
| 3,232,892 | 2/1966 | Fisher | 260—2.5 |
| 3,234,152 | 2/1966 | Fuller | 260—2.5 |
| 3,236,789 | 2/1966 | Fuller | 260—2.5 |
| 3,322,969 | 5/1967 | Fisher et al. | 260—2.5 |
| 3,332,895 | 7/1967 | Munn | 260—2.5 |

MURRAY TILLMAN, *Primary Examiner.*

M. FOELAK, *Assistant Examiner.*